(12) United States Patent
Bonora et al.

(10) Patent No.: US 10,011,150 B2
(45) Date of Patent: Jul. 3, 2018

(54) ROTARY SEAL FOR A CENTRAL TIRE INFLATION SYSTEM

(71) Applicant: DANA ITALIA SPA, Arco (TN) (IT)

(72) Inventors: Mario Bonora, Torbole sul Garda (IT); Ettore Cosoli, Padua (IT); Daniele Tonini, Ledro (IT)

(73) Assignee: Dana Italia S.p.A., Arco (TN) (IT)

( * ) Notice: Subject to any disclaimer, the term of this patent is extended or adjusted under 35 U.S.C. 154(b) by 0 days.

(21) Appl. No.: 15/321,214

(22) PCT Filed: Jul. 2, 2015

(86) PCT No.: PCT/EP2015/065074
§ 371 (c)(1),
(2) Date: Dec. 22, 2016

(87) PCT Pub. No.: WO2016/001349
PCT Pub. Date: Jan. 7, 2016

(65) Prior Publication Data
US 2017/0210184 A1    Jul. 27, 2017

Related U.S. Application Data

(60) Provisional application No. 62/020,111, filed on Jul. 2, 2014, provisional application No. 62/073,537, filed on Oct. 31, 2014.

(51) Int. Cl.
*F16J 15/34* (2006.01)
*B60C 23/00* (2006.01)
*F16L 27/08* (2006.01)

(52) U.S. Cl.
CPC ............. *B60C 23/003* (2013.01); *F16J 15/34* (2013.01); *F16L 27/0804* (2013.01)

(58) Field of Classification Search
CPC ...... F16J 15/34; F16J 15/3204; F16J 15/3216; F16J 15/3248; F16J 15/3252; B60C 23/003; F16L 27/0804
See application file for complete search history.

(56) References Cited

U.S. PATENT DOCUMENTS 4,730,656 A    3/1988   Goodell et al.
4,770,425 A *  9/1988   Colanzi ................ F16J 15/3264
                                                   277/353

(Continued)

FOREIGN PATENT DOCUMENTS

CN     101378917 A    3/2009
DE     10064231 A1    9/2001

(Continued)

OTHER PUBLICATIONS

International Search Report and Written Opinion for Application No. PCT/EP2015/065074, dated Sep. 4, 2015.

*Primary Examiner* — Gilbert Y Lee
(74) *Attorney, Agent, or Firm* — Marshall & Melhorn, LLC (57) ABSTRACT

A rotary seal arrangement for use with a central tire inflation system is provided. The rotary seal arrangement comprises a stationary portion, a rotating portion, a first sealing ring, a second sealing ring, and a first bushing portion. The stationary portion defines a first air passage therethrough and the rotating portion defines a second air passage therethrough. The first sealing ring and the second sealing ring are each disposed on one of the rotating portion and the stationary portion. The first bushing is disposed on one of the rotating portion and the stationary portion. The first bushing is in dynamic sealing engagement with the first sealing ring. The stationary portion, the rotating portion, the first sealing ring, and the second sealing ring form a sealed cavity that (Continued)

facilitates fluid communication between the first air passage and the second air passage.

18 Claims, 3 Drawing Sheets

(56) References Cited

U.S. PATENT DOCUMENTS

| | | | |
|---|---|---|---|
| 4,987,937 A | | 1/1991 | Nowicke |
| 5,067,732 A | * | 11/1991 | Szabo ............... F16J 15/324 |
| | | | 277/563 |
| 5,174,839 A | | 12/1992 | Schultz et al. |
| 5,203,391 A | | 4/1993 | Fox |
| 5,221,381 A | | 6/1993 | Hurrell, II |
| 5,236,028 A | | 8/1993 | Goodell et al. |
| 5,253,688 A | | 10/1993 | Tigges |
| 5,484,213 A | * | 1/1996 | Caillaut .............. B60C 23/003 |
| | | | 152/417 |
| 5,868,881 A | | 2/1999 | Bradley |
| 6,145,558 A | | 11/2000 | Schmitz |
| 6,182,727 B1 | | 2/2001 | Beesley |
| 6,199,611 B1 | | 3/2001 | Wernick |
| 6,283,186 B1 | | 9/2001 | Krisher |
| 6,325,123 B1 | | 12/2001 | Gao et al. |
| 6,363,985 B1 | | 4/2002 | Beesley |
| 6,497,262 B1 | | 12/2002 | Skoff et al. |
| 6,575,269 B1 | | 6/2003 | Skoff et al. |
| 6,668,888 B1 | | 12/2003 | Beesley et al. |
| 6,857,457 B2 | | 2/2005 | Nienhaus |
| 7,255,481 B2 | | 8/2007 | Mermoud |
| 7,416,005 B2 | | 8/2008 | Hennig et al. |
| 7,690,412 B1 | | 4/2010 | Jenkinson et al. |
| 7,896,045 B2 | | 3/2011 | Solie et al. |
| 7,967,045 B2 | | 6/2011 | Jenkinson et al. |
| 7,997,316 B2 | | 8/2011 | Walter et al. |
| 8,052,400 B2 | | 11/2011 | Isono |
| 8,397,774 B2 | | 3/2013 | Gnoska et al. |
| 8,783,314 B2 | | 7/2014 | Tigges |
| 2002/0112802 A1 | | 8/2002 | D'Amico |
| 2003/0159766 A1 | | 8/2003 | Nienhaus |
| 2005/0045259 A1 | | 3/2005 | Hottebart et al. |
| 2005/0133134 A1 | | 6/2005 | Ingram et al. |
| 2005/0161137 A1 | | 7/2005 | Hoang |
| 2008/0185086 A1 | | 8/2008 | Ingram et al. |
| 2009/0084481 A1 | | 4/2009 | Kalavitz |
| 2010/0038004 A1 | | 2/2010 | Saadat |
| 2010/0065177 A1 | | 3/2010 | Saadat |
| 2014/0261941 A1 | | 9/2014 | Knapke et al. |
| 2015/0059945 A1 | | 3/2015 | Flory et al. |
| 2015/0068653 A1 | | 3/2015 | Cis et al. |
| 2015/0210124 A1 | | 7/2015 | Hibbler et al. |
| 2015/0290986 A1 | | 10/2015 | Tsiberidis |
| 2015/0352911 A1 | | 12/2015 | Bittlingmaier |
| 2015/0367690 A1 | | 12/2015 | Keeney et al. |
| 2016/0009148 A1 | | 1/2016 | Berkness et al. |
| 2016/0016443 A1 | | 1/2016 | Morgan |

FOREIGN PATENT DOCUMENTS

| | | |
|---|---|---|
| EP | 0588595 A1 | 3/1994 |
| EP | 1095799 A1 | 5/2001 |
| FR | 2874671 A1 | 3/2006 |
| WO | 2013156430 A1 | 10/2013 |
| WO | 2014063873 A2 | 5/2014 |

* cited by examiner

ROTARY SEAL FOR A CENTRAL TIRE INFLATION SYSTEM

CLAIM OF PRIORITY

The present application claims the benefit of priority to U.S. Provisional Application No. 62/020,111 filed on Jul. 2, 2014 and U.S. Provisional Application No. 62/073,537 filed on Oct. 31, 2014, both of which are incorporated herein in their entirety by reference.

FIELD OF THE INVENTION

The present invention relates to tire inflation systems and more specifically to tire inflation systems having rotary seals external to an axle.

BACKGROUND OF THE INVENTION

Tire inflation systems are becoming crucial in motor vehicles. Those systems are deeply adopted in different types of vehicles such as trucks, tractors or earth-moving machines. A main objective of a tire inflation system is to adapt the tire pressure to different operating conditions, which depends basically on the ground to be traveled as well as a speed and a load of a vehicle using the tire inflation system. A contact area of a tire is influenced by a pressure of the tire. With a low tire pressure the contact area is increased, and with a high tire pressure the contact area is decreased. For this reason, it is necessary to optimize a tire pressure depending on the ground conditions. A lower pressure is adopted for soft surfaces such as gravel, while a higher pressure is chosen when traveling on hard surfaces, such as tarmac or concrete. Moreover, appropriate tire pressure can provide enhanced tire preservation, reduced soil compaction, improved fuel consumption, and reduced overall operating costs.

Figure 1:
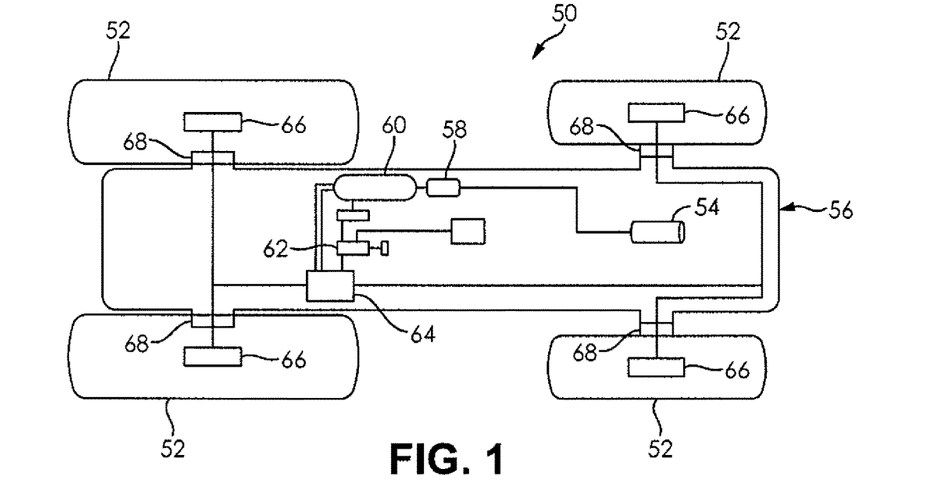
FIG. 1 is a schematic diagram of a central tire inflation system known in the art.

FIG. 1 illustrates a central tire inflation system (CTIS) 50 that is known in the art. It is understood that the CTIS 50 is exemplary in nature, and that the CTIS 50 may be adapted through the addition or removal of components. The CTIS 50 is a system for inflating or deflating one or more tires 52, depending on a ground condition. Generally, the CTIS 50 is comprised of several components and devices, as shown in FIG. 1. An air compressor 54, which provides pressurized air, is fitted to a vehicle 56. The compressed air passes through an air dryer 58 and is stored in an air tank 60. Based on an input coming from a driver of the vehicle 56 or from an internal algorithm of an electronic control unit (ECU) 62, a pneumatic control unit 64 provides air flow to the tires 52. Each of the tires 52 is fitted with a secondary wheel valve 66 that is used to inflate of deflate each of the tires 52. The CTIS 50 also typically comprises a rotary transmission joint 68 which allows for compressed air to be transmitted from a portion of the CTIS 50 on the vehicle 56 to each of the tires 52, which are rotatably. The rotary transmission joint 68 affords fluid communication for each of the tire 52. Such a rotary transmission joint 68 typically comprises a stator structural group coupled to the vehicle 56 and a rotor structural group located on the tire 52.

Since it is desirable that the tire 52 can be inflated and deflated during operation of the vehicle 56, tire inflation systems known from the prior art comprise rotary seal arrangements which are disposed between a vehicle spindle and a wheel hub, on which the wheel and the tire are mounted. Generally, such rotary seals are the most critical devices in the CTIS 50, since they are required to transmit the fluid from the pneumatic line to the wheel valve 66 while rotating with the tire 52. These rotary seals usually include sealing means, disposed on the spindle and/or on the wheel hub, in sliding contact between each other. The sealing means, therefore, forms a dynamical annular seal chamber, through which fluid can be transported from the pneumatic control unit 64 to the tire 52 and vice versa.

In some cases, solutions of this problem have been obtained by fitting the rotary joint with special sealing means inside the axle of the vehicle. A version of this solution has been developed by DANA ITALIA S.P.A., which is described in published international patent application number WO 2013/156430 A1. This solution is particularly interesting because of its compactness and integration with the whole axle. However, such a solution requires the design of the rotatable part to be integrated with the spindle and the wheel hub. In some cases, this requires a complex manufacturing setup due to a length of the bores that have to be formed in the axle.

It would be advantageous to develop a rotary seal arrangement for a central tire inflation system that is located externally to an axle spindle that facilitates assembly of the rotary seal arrangement.

SUMMARY OF THE INVENTION

Presently provided by the invention, a rotary seal arrangement for a central tire inflation system that is located externally to an axle spindle that facilitates assembly of the rotary seal arrangement, has surprisingly been discovered.

In one embodiment, the present invention is directed to a rotary seal arrangement for use with a central tire inflation system. The rotary seal arrangement comprises a stationary portion, a rotating portion, a first sealing ring, a second sealing ring, and a first bushing. The stationary portion defines a first air passage therethrough. The rotating portion defines a second air passage therethrough. The first sealing ring is disposed on one of the rotating portion and the stationary portion. The second sealing ring is disposed on one of the rotating portion and the stationary portion. The first bushing is disposed on one of the rotating portion and the stationary portion. The first bushing is in dynamic sealing engagement with the first sealing ring. The stationary portion, the rotating portion, the first sealing ring, and the second sealing ring form a sealed cavity that facilitates fluid communication between the first air passage and the second air passage.

In another embodiment, the present invention is directed to a rotary seal arrangement for use with a central tire inflation system. The rotary seal arrangement comprises a stationary portion, a rotating portion, a first sealing ring, a second sealing ring, a first bushing, and a second bushing. The stationary portion defines a first air passage therethrough. The stationary portion includes an external ring disposed thereon and coupled thereto. The rotating portion defines a second air passage therethrough. The first sealing ring is disposed on the rotating portion. The second sealing ring is disposed on the external ring. The first bushing is disposed on the stationary portion. The first bushing is in dynamic sealing engagement with the first sealing ring. The second bushing is disposed on the rotating portion. The second bushing is in dynamic sealing engagement with the second sealing ring. The stationary portion, the rotating portion, the first sealing ring, and the second sealing ring form a sealed cavity that facilitates fluid communication between the first air passage and the second air passage.

In another embodiment, the present invention is directed to a rotary seal arrangement for use with a central tire inflation system. The rotary seal arrangement comprises a stationary assembly, a rotating portion, a first sealing ring, a second sealing ring, a first bushing, and a second bushing. The stationary assembly comprises a main portion, a radially extending portion, and a seal engaging portion. The stationary assembly defines a first air passage therethrough. The rotating portion defines a second air passage therethrough. The first sealing ring is disposed on the seal engaging portion. The second sealing ring is disposed on the seal engaging portion. The first bushing is disposed on the rotating portion. The first bushing is in dynamic sealing engagement with the first sealing ring. The second bushing is disposed on the rotating portion. The second bushing is in dynamic sealing engagement with the second sealing ring. The stationary portion, the rotating portion, the first sealing ring, and the second sealing ring form a sealed cavity that facilitates fluid communication between the first air passage and the second air passage.

Various aspects of this invention will become apparent to those skilled in the art from the following detailed description of the preferred embodiment, when read in light of the accompanying drawings.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions, orientations or other physical characteristics relating to the embodiments disclosed are not to be considered as limiting, unless expressly stated otherwise.

Figure 2:
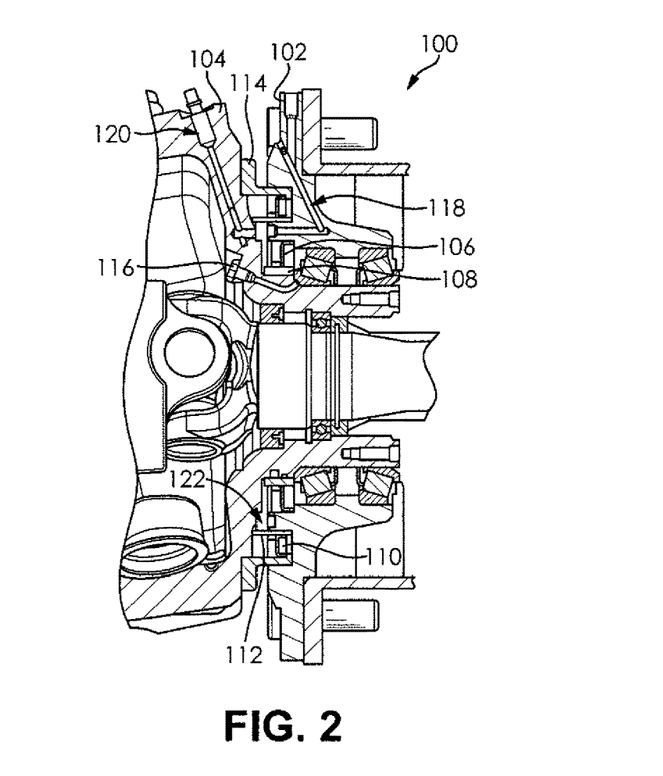
FIG. 2 is a sectional view of a portion of a central tire inflation system including a rotary seal arrangement according to a first embodiment of the invention.

FIG. 2 illustrates a rotary seal arrangement 100 according to an embodiment of the invention. The rotary seal arrangement 100 comprises a rotating portion 102, a stationary portion 104, a first sealing ring 106, a first bushing 108, a second sealing ring 110, a second bushing 112, an external ring 114, and a breather 116. The first bushing 108 and the external ring 114 are disposed on the stationary portion 104. The first sealing ring 106 and the second bushing 112 are disposed on the rotating portion 102. The second sealing ring 110 is disposed on the external ring 114. The breather 116 is formed in the stationary portion 104.

The rotating portion 102 may be a portion of a wheel hub or a portion of a shaft. The rotating portion 102 is typically cast and machined; however, it is understood that the rotating portion 102 may be formed in any manner. The rotating portion 102 defines a primary air passage 118 therethrough. As shown in FIG. 2, the primary air passage 118 is formed by an intersection of three apertures formed in the rotating portion 102; however, it is understood that the primary air passage 118 may comprise any number of apertures formed in the rotating portion 102. As shown in FIG. 2, at least one of the apertures may be plugged to facilitate formation of the primary air passage 118.

The stationary portion 104 may be a portion of an axle housing or a portion of a steering knuckle. The stationary portion 104 is typically cast and machined; however, it is understood that the stationary portion 104 may be formed in any manner. The stationary portion 104 defines a secondary air passage 120 therethrough. As shown in FIG. 2, the secondary air passage 120 is formed by an intersection of two apertures formed in the stationary portion 104; however, it is understood that the secondary air passage 120 may comprise any number of apertures formed in the stationary portion 104.

The first sealing ring 106 facilitates dynamic sealing engagement between the rotating portion 102 and the first bushing 108. The first sealing ring 106 is a sealing assembly that militates against a transfer of air, oil, or dust between a sealed cavity 122 formed between the rotating portion 102 and the stationary portion 104 and an ambient environment the rotary seal arrangement 100 is operated in. At least a portion of the first sealing ring 106 is configured to provide a sealing force against the first bushing 108 in a radial manner. Further, at least a portion of the first sealing ring 106 is formed from a polymeric material. The first sealing ring 106 efficiently separates the sealed cavity 122 intended for the air passage, from an inner operating environment between the rotating portion 102 and the stationary portion 104, avoiding air leakage.

The first bushing 108 is an annulet disposed on and coupled to the stationary portion 104. The first bushing 108 provides a surface which can be dynamically sealingly engaged with the first sealing ring 106. The first bushing 108 is formed from a wear resistant, low friction material; however, it is understood that other material may be used.

The second sealing ring 110 facilitates dynamic sealing engagement between the stationary portion 104 and the second bushing 112. The second sealing ring 110 is a sealing assembly that militates against a transfer of air, oil, or dust between the sealed cavity 122 formed between the rotating portion 102 and the stationary portion 104 and an ambient environment the rotary seal arrangement 100 is operated in. At least a portion of the second sealing ring 110 is configured to provide a sealing force against the second bushing 112 in a radial manner. Further, at least a portion of the second sealing ring 110 is formed from a polymeric material. The second sealing ring 110 efficiently separates the sealed cavity 122 intended for the air passage, from the ambient environment the rotary seal arrangement 100 is operated in, avoiding air leakage.

The second bushing 112 is an annulet disposed on and coupled to the rotating portion 102. The second bushing 112 provides a surface which can be dynamically sealingly engaged with the second sealing ring 110. The second bushing 112 is formed from a wear resistant, low friction material; however, it is understood that other material may be used.

The external ring 114 is an annulet disposed on and coupled to the stationary portion 104. The external ring 114 is coupled to the stationary portion 104 in any conventional manner. The external ring 114 provides a surface onto which the second sealing ring 110 can be mounted. The external ring 114 is formed from a metal; however, it is understood that other rigid materials may be used. As shown in FIG. 2, a cross-section of the external ring 114 is substantially "L" shaped; however, it is understood that the cross-section of the external ring 114 may have other shapes.

The breather 116 is a conduit defined by the stationary portion 104. The breather 116 is positioned adjacent the first bushing 108. The breather 116 includes an exhaust valve which facilitates fluid communication between the inner operating environment between the rotating portion 102 and the stationary portion 104 and the ambient environment the rotary seal arrangement 100 is operated in, in the event of fluid leakage from the inner operating environment.

Figure 3:
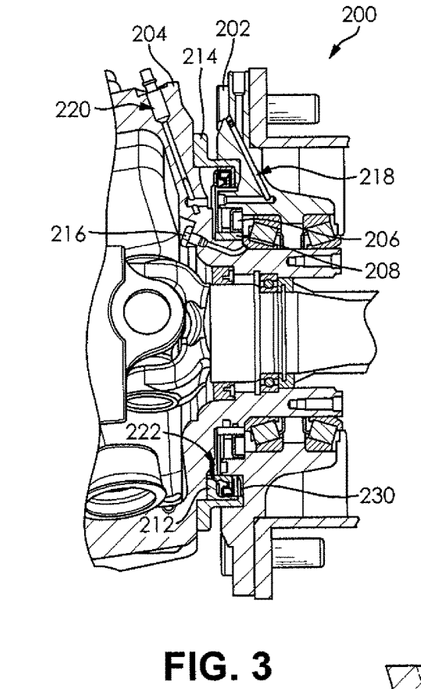
FIG. 3 is a sectional view of a portion of a central tire inflation system including a rotary seal arrangement according to another embodiment of the invention.

FIG. 3 illustrates a rotary seal arrangement 200 according to an embodiment of the invention. The embodiment shown in FIG. 3 includes similar components to the rotary seal arrangement 100 illustrated in FIG. 2. Similar features of the embodiment shown in FIG. 3 are numbered similarly in series, with the exception of the features described below.

FIG. 3 illustrates the rotary seal arrangement 200 according to an embodiment of the invention. The rotary seal arrangement 200 comprises a rotating portion 202, a stationary portion 204, a first sealing ring 206, a first bushing 208, a second sealing ring 230, a second bushing 212, an external ring 214, and a breather 216. The first bushing 208 and the external ring 214 are disposed on the stationary portion 204. The first sealing ring 206 and the second bushing 212 are disposed on the rotating portion 202. The second sealing ring 230 is disposed on the external ring 214. The breather 216 is formed in the stationary portion 204.

The second sealing ring 230 facilitates dynamic sealing engagement between the stationary portion 204 and the second bushing 212. The second sealing ring 230 is a sealing assembly that militates against a transfer of air, oil, or dust between the sealed cavity 222 formed between the rotating portion 202 and the stationary portion 204 and an ambient environment the rotary seal arrangement 200 is operated in. At least a portion of the second sealing ring 230 is configured to provide a sealing force against the second bushing 212 in a radial manner. Further, at least a portion of the second sealing ring 230 is formed from a polymeric material. The second sealing ring 230 efficiently separates the sealed cavity 222 intended for the air passage, from an inner operating environment between the rotating portion 202 and the stationary portion 204, avoiding air leakage.

The breather 216 is a conduit defined by the stationary portion 204. The breather 216 is positioned adjacent the first bushing 208. The breather 216 includes an exhaust valve which facilitates fluid communication between the inner operating environment between the rotating portion 202 and the stationary portion 204 and the ambient environment the rotary seal arrangement 200 is operated in, in the event of fluid leakage from the inner operating environment.

Figure 4:
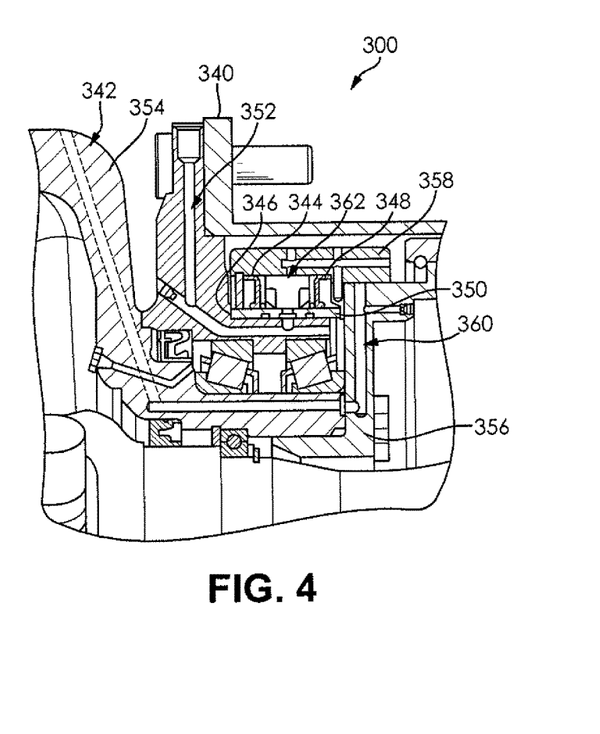
FIG. 4 is a sectional view of a portion of a central tire inflation system including a rotary seal arrangement according to another embodiment of the invention.

FIG. 4 illustrates a rotary seal arrangement 300 according to an embodiment of the invention. The embodiment shown in FIG. 4 includes similar components to the rotary seal arrangement 100 illustrated in FIG. 2. Similar features of the embodiment shown in FIG. 4 are numbered similarly in series, with the exception of the features described below.

FIG. 4 illustrates the rotary seal arrangement 300 according to an embodiment of the invention. The rotary seal arrangement 300 comprises a rotating portion 340, a stationary assembly 342, a first sealing ring 344, a first bushing 346, a second sealing ring 348, and a second bushing 350. The first bushing 346 and the second bushing 350 are disposed on the rotating portion 340. The first sealing ring 344 and the second sealing ring 348 are disposed on the stationary assembly 342.

The rotating portion 340 may be a portion of a wheel hub or a portion of a shaft. The rotating portion 340 is typically cast and machined; however, it is understood that the rotating portion 340 may be formed in any manner. The rotating portion 340 defines a primary air passage 352 therethrough. As shown in FIG. 4, the primary air passage 352 is formed by an intersection of four apertures formed in the rotating portion 340; however, it is understood that the primary air passage 352 may comprise any number of apertures formed in the rotating portion 340. As shown in FIG. 4, at least two of the apertures may be plugged to facilitate formation of the primary air passage 352.

The stationary assembly 342 may be a portion of an axle housing or a portion of a steering knuckle. The stationary assembly 342 is typically formed from cast and machined bodies; however, it is understood that the stationary assembly 342 may be formed in any manner. The stationary assembly 342 comprises a main portion 354, a radially extending portion 356, and a seal engaging portion 358. The radially extending portion 356 is coupled to and sealingly engaged with the main portion 354 in any conventional manner, after the rotating portion 340 is disposed about the main portion 354. The seal engaging portion 358 is coupled to and sealingly engaged with the radially extending portion 356 in any conventional manner. The stationary assembly 342 defines a secondary air passage 360 therethrough. As shown in FIG. 4, the secondary air passage 360 is formed by an intersection of ten apertures formed in the main portion 354, the radially extending portion 356, and the seal engaging portion 358; however, it is understood that the secondary air passage 360 may comprise any number of apertures formed in the main portion 354, the radially extending portion 356, and the seal engaging portion 358.

The first sealing ring 344 facilitates dynamic sealing engagement between the seal engaging portion 358 and the first bushing 346. The first sealing ring 344 is a sealing assembly that militates against a transfer of air, oil, or dust between a sealed cavity 362 formed between the stationary assembly 342 and the rotating portion 340 and an ambient environment the rotary seal arrangement 300 is operated in. At least a portion of the first sealing ring 344 is configured to provide a sealing force against the first bushing 346 in a radial manner. Further, at least a portion of the first sealing ring 344 is formed from a polymeric material. The first sealing ring 344 efficiently separates the sealed cavity 362 intended for the air passage, from an inner operating environment between the rotating portion 340 and the stationary assembly 342, avoiding air leakage.

The first bushing 346 is an annulet disposed on and coupled to the rotating portion 340. The first bushing 346 provides a surface which can be dynamically sealingly engaged with the first sealing ring 344. The first bushing 346 is formed from a wear resistant, low friction material; however, it is understood that other material may be used.

The second sealing ring 348 facilitates dynamic sealing engagement between the seal engaging portion 358 and the second bushing 350. The second sealing ring 348 is a sealing assembly that militates against a transfer of air, oil, or dust between the sealed cavity 362 formed between the stationary assembly 342 and the rotating portion 340 and an ambient environment the rotary seal arrangement 300 is operated in. At least a portion of the second sealing ring 348 is configured to provide a sealing force against the second bushing 350 in a radial manner. Further, at least a portion of the second sealing ring 348 is formed from a polymeric material. The second sealing ring 348 efficiently separates the sealed cavity 362 intended for the air passage, from an inner operating environment between the rotating portion 340 and the stationary assembly 342, avoiding air leakage.

The second bushing 350 is an annulet disposed on and coupled to the rotating portion 340. The second bushing 350 provides a surface which can be dynamically sealingly engaged with the second sealing ring 348. The second bushing 350 is formed from a wear resistant, low friction material; however, it is understood that other material may be used.

Figure 5:
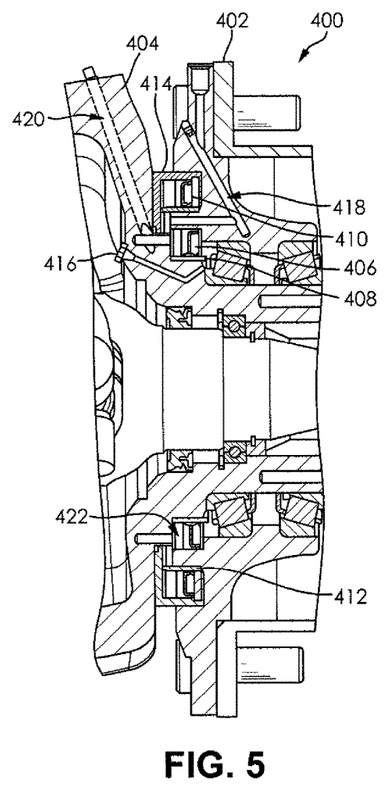
FIG. 5 is a sectional view of a portion of a central tire inflation system including a rotary seal arrangement according to another embodiment of the invention.

FIG. 5 illustrates a rotary seal arrangement 400 according to an embodiment of the invention. The embodiment shown in FIG. 5 includes similar components to the rotary seal arrangement 100 illustrated in FIG. 2. Similar features of the embodiment shown in FIG. 5 are numbered similarly in series, with the exception of the features described below.

FIG. 5 illustrates the rotary seal arrangement 400 according to an embodiment of the invention. The rotary seal arrangement 400 comprises a rotating portion 402, a stationary portion 404, a first sealing ring 406, a first bushing 408, a second sealing ring 410, a second bushing 412, and an external ring 414. The first bushing 408 and the external ring 414 are disposed on the stationary portion 404. The first sealing ring 406 and the second bushing 412 are disposed on the rotating portion 402. The second sealing ring 410 is disposed on the external ring 414.

The external ring 414 is an annulet disposed on and coupled to the stationary portion 404. The external ring 414 is coupled to the stationary portion 404 in any conventional manner. The external ring 414 provides a surface onto which the second sealing ring 410 can be mounted. The external ring 414 is formed from a metal; however, it is understood that other rigid materials may be used. As shown in FIG. 5, a cross-section of the external ring 414 is substantially "L" shaped and extends inwardly along from the stationary portion 404 in a radial manner; however, it is understood that the cross-section of the external ring 414 may have other shapes.

Figure 6:
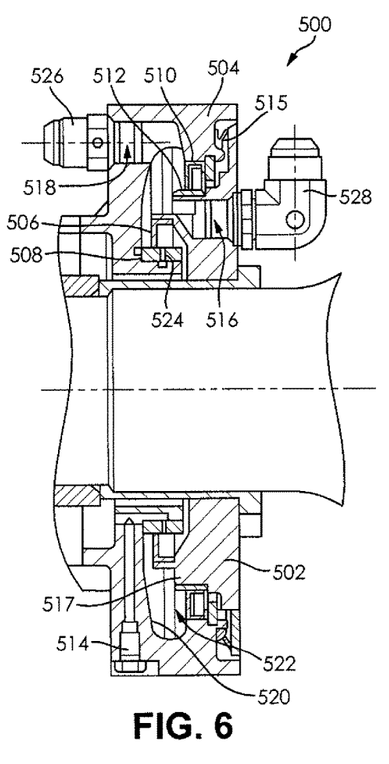
FIG. 6 is a sectional view of a portion of a central tire inflation system including a rotary seal arrangement according to another embodiment of the invention.

FIG. 6 illustrates a rotary seal arrangement 500 according to an embodiment of the invention. The embodiment shown in FIG. 6 includes similar components to the rotary seal arrangement 100 illustrated in FIG. 2. Similar features of the embodiment shown in FIG. 6 are numbered similarly in series, with the exception of the features described below.

FIG. 6 illustrates a rotary seal arrangement 500 according to an embodiment of the invention. The rotary seal arrangement 500 comprises a rotating portion 502, a stationary portion 504, a first sealing ring 506, a first bushing 508, a second sealing ring 510, a second bushing 512, an exhaust vent 514, and a dust lip 515. The first bushing 508 and the second sealing ring 510 are disposed on the stationary portion 504. The first sealing ring 506 and the second bushing 512 are disposed on the rotating portion 502. The exhaust vent 514 is formed in the stationary portion 504. The dust lip 515 is disposed on the stationary portion 504 and is sealingly engaged with the rotating portion 502.

The rotating portion 502 may be a portion of a wheel hub or a portion of a shaft. The rotating portion 502 is typically cast and machined; however, it is understood that the rotating portion 502 may be formed in any manner. The rotating portion 502 defines a primary air passage 516 therethrough. As shown in FIG. 6, the primary air passage 516 is formed by an intersection of two apertures formed in the rotating portion 502; however, it is understood that the primary air passage 516 may comprise any number of apertures formed in the rotating portion 502. One of the apertures that form the primary air passage 516 intersects an interior surface 517 of the rotating portion 502. The interior surface 517 defines an annular surface in the rotating portion 502. As shown in FIG. 6, the apertures that form the primary air passage 516 are formed on opposing sides of the rotating portion 502. Further, the apertures that form the primary air passage 516 are non-coincidental and of different diameters, but it is understood that the apertures that form the primary air passage 516 may have other shapes and orientations.

The stationary portion 504 may be a portion of an axle housing or a portion of a steering knuckle, for example. Further, it is understood that the stationary portion 504 may be formed separate from the axle housing or the steering knuckle and coupled thereto or to another axle component in any conventional manner. The stationary portion 504 is typically cast and machined; however, it is understood that the stationary portion 504 may be formed in any manner. The stationary portion 104 defines a secondary air passage 518 therethrough. As shown in FIG. 6, the secondary air passage 518 is an aperture formed in the stationary portion 504 that intersects an interior surface 520 of the stationary portion 504; however, it is understood that the secondary air passage 518 may comprise any number of apertures formed in the stationary portion 504. The interior surface 520 defines an annular recess in the stationary portion 504. When the rotary seal arrangement 500 is assembled, the interior surface 520, the interior surface 517, the sealing rings 506, 510, and the bushings 508, 512 form a sealed cavity 522 between the stationary portion 504 and the rotating portion 502.

The first sealing ring 506 facilitates dynamic sealing engagement between the rotating portion 502 and the first bushing 508. The first sealing ring 506 is a sealing assembly that militates against a transfer of air, oil, or dust between the sealed cavity 522 formed between the rotating portion 502 and the stationary portion 504 and an ambient environment the rotary seal arrangement 500 is operated in. At least a portion of the first sealing ring 506 is configured to provide a sealing force against the first bushing 508 in a radial manner. Further, at least a portion of the first sealing ring 506 is formed from a polymeric material. The first sealing ring 506 efficiently separates the sealed cavity 522, which is used as an air conduit, from an operating environment between the rotating portion 502 and the stationary portion 504, avoiding air leakage.

The first bushing 508 is an annulet disposed on and coupled to the stationary portion 504. The first bushing 508 provides a surface which can be dynamically sealingly engaged with the first sealing ring 506. The first bushing 508 is formed from a wear resistant, low friction material; however, it is understood that other material may be used. The first bushing 508 includes a fluid passage 524 formed therethrough, to facilitate fluid communication between the operating environment between the rotating portion 502 and the stationary portion 504 and the exhaust vent 514. The fluid passage 524 may be defined by an interstitial space between two spaced apart annulets or by at least one perforation formed in the first bushing 508.

The second sealing ring 510 facilitates dynamic sealing engagement between the stationary portion 504 and the second bushing 512. The second sealing ring 510 is a sealing assembly that militates against a transfer of air, oil, or dust between the sealed cavity 522 formed between the rotating portion 502 and the stationary portion 504 and an ambient environment the rotary seal arrangement 500 is operated in. At least a portion of the second sealing ring 510 is configured to provide a sealing force against the second bushing 512 in a radial manner. Further, at least a portion of the second sealing ring 510 is formed from a polymeric material. The second sealing ring 510 efficiently separates the sealed cavity 522 intended for the air passage, from the ambient environment the rotary seal arrangement 500 is operated in, avoiding air leakage.

The second bushing 512 is an annulet disposed on and coupled to the stationary portion 504. The second bushing 512 provides a surface which can be dynamically sealingly engaged with the second sealing ring 510. The second bushing 512 is formed from a wear resistant, low friction material; however, it is understood that other material may be used.

The exhaust vent 514 is a conduit defined by the stationary portion 504. The exhaust vent 514 is positioned adjacent the first bushing 508 and is directed in a radially outward manner to facilitate fluid communication between the operating environment between the rotating portion 502 and the stationary portion 504 and an ambient environment the rotary seal arrangement 500 is operated in. The exhaust vent 514 may include an exhaust valve which facilitates one way fluid communication between the operating environment between the rotating portion 502 and the stationary portion 504 and the ambient environment the rotary seal arrangement 500 is operated in, in the event of fluid leakage or fluid transfer from the inner operating environment.

The dust lip 515 is disposed on the stationary portion 504 and is sealingly engaged with the rotating portion 502. The dust lip 515 facilitates dynamic sealing engagement between the stationary portion 504 and the rotating portion 502. The dust lip 515 is a seal having at least one flexible portion that militates against a transfer of air, oil, or dust between the rotating portion 502 and the stationary portion 504 and an ambient environment the rotary seal arrangement 500 is operated in. The at least one flexible portion of the dust lip 515 is configured to provide a sealing force against the rotating portion 502 in an axial manner. Further, at least a portion of the dust lip 515 is formed from a polymeric material.

In use, the rotary seal arrangement 100, 200, 300, 400 provides many advantages over conventional rotary seal arrangements. Firstly, the rotary seal arrangement 100, 200, 300, 400 allows a design of the rotating portion 102, 202, 340, 402 to be separate from the remaining portions of the rotary seal arrangement 100, 200, 300, 400, such as an arrangement of sealing rings used, type of sealing rings used, or design of the stationary portion 104, 204, 404 or the stationary assembly 342, for example. Secondly, the rotary seal arrangement 100, 200, 300, 400 allows the use of a conduit of greater diameter, and particularly of the sealed cavity 122, 222, 362, 422, since the solution is shifted externally to the stationary portion 104, 204, 404 or the stationary assembly 342. Further, the rotary seal arrangement 100, 200, 300, 400 is compact in size compared to conventional rotary seal arrangements and is simpler to manufacture and assemble. Also, the rotary seal arrangement 100, 200, 400 makes use of conduits that are shorter and of greater diameter than conduits used in conventional rotary seal arrangements, and therefore the rotary seal arrangement 100, 200, 400 limits a waste of material and a presence of metal chips which may be present in the components of the rotary seal arrangement 100, 200, 400 following manufacture. Further, the rotary seal arrangement 100, 200, 400 enhances an inflation and a deflation performance due to a broader diameter of the passages 118, 120, 218, 220, 418, 420 and conduits that are shorter and of greater diameter than conduits used with conventional rotary seal arrangements, allowing for a higher fluid flow rate. Lastly, the rotary seal arrangement 100, 200, 300, 400 provides a cleaner environment for operation of a portion of a tire inflation system, as the rotary seal arrangement 100, 200, 300, 400 is separate from bearings used between the rotating portion 102, 202, 340, 402 and the stationary portion 104, 204, 404 or the stationary assembly 342; thus allowing the possibility to exhaust air directly outside of the rotary seal arrangement 100, 200, 300, 400.

Air enters in the rotary seal arrangement 100, 200, 300, 400 through the passage 120, 220, 360, 420 in the stationary portion 104, 204, 404 or the stationary assembly 342 and exits through the passage 118, 218, 352, 418 in the rotating portion 102, 202, 340, 402. Such a system, integrated in the end-part of the wheel shaft, relies on the sealing properties of the sealing rings 108, 110, 208, 210, 344, 348, 408, 410. The sealing rings 106, 110, 206, 210, 344, 348, 406, 410, rotate respectively around the bushings 108, 112, 208, 212, 346, 350, 408, 412 which in the case of the rotary seal arrangement 100, 200, 400 are arranged concentrically. The rotary seal arrangement 100, 200, 400 allows a higher compactness as well as allowing suitable diameters for the conduit as well as a limited depth of the conduits which are formed nearby in the stationary portion 104, 204, 404 and the rotating portion 102, 202, 402. The rotary seal arrangement 100, 200, 300, 400 allows the option of advance assembly of the sealing ring 110, 210, 410 in the external ring 114, 214, 414. Moreover, the rotary seal arrangement 100, 200 includes, in case of inner fluid leakage, a breather 116, 216, 316, 416 which includes an exhaust valve. The rotary seal arrangement 100, 200 allows a design of the rotating portion 102, 202, 340, 402 to be separate from the remaining portions of the rotary seal arrangement 100, 200, 300, 400.

In use, the rotary seal arrangement 500 provides many advantages over conventional rotary seal arrangements. Firstly, the rotary seal arrangement 500 allows a design of the rotating portion 502 to be separate from the remaining portions of the rotary seal arrangement 500, such as a design or types of the sealing rings 506, 510, or a design of the stationary portion 504, for example. Secondly, the rotary seal arrangement 500 allows the use of the air passages 516, 518 having increased diameters, and particularly of the sealed cavity 522. Further, the rotary seal arrangement 500 is compact in size compared to conventional rotary seal arrangements and is simpler to manufacture and assemble. Also, the rotary seal arrangement 500 makes use of the air passages 516, 518 that are shorter and of greater diameter than conduits used in conventional rotary seal arrangements, and therefore the rotary seal arrangement 500 limits a waste of material and a presence of metal chips which may be present in the components of the rotary seal arrangement 500 following manufacture. Further, the rotary seal arrangement 500 enhances an inflation and a deflation performance due to a broader diameter of the air passages 516, 518 and conduits that are shorter and of greater diameter than conduits used with conventional rotary seal arrangements, allowing for a higher fluid flow rate. The rotary seal arrangement 500 provides a cleaner environment for operation of a portion of a tire inflation system, as the rotary seal arrangement 500 is separate from bearings used adjacent the rotary seal arrangement 500; thus allowing the possibility to exhaust air directly outside of the rotary seal arrangement 500. Lastly, the rotary seal arrangement 500 allows a design of the components of the rotary seal arrangement 500 to be separate from a design of a supporting component that the rotary seal arrangement 500 is disposed about, such as an axle housing or a steering knuckle.

Air enters in the rotary seal arrangement 500 through a fitting 526 which is in fluid communication with the passage 518 in the stationary portion 504 and exits through a fitting 528 which is in fluid communication with the passage 516 in the rotating portion 502. Such a system, disposed adjacent an end-part of the wheel shaft, relies on the sealing properties of the sealing rings 506, 510. The sealing rings 506, 510, rotate respectively around the bushings 508, 512, which in the case of the rotary seal arrangement 500 are arranged radially from one another. The rotary seal arrangement 500 allows a higher compactness as well as allowing suitable diameters for the conduit as well as a limited depth of the conduits which are formed nearby in the stationary portion 504 and the rotating portion 502. The rotary seal arrangement 500 allows the option of advance assembly of the sealing ring 510 and the bushing 508 in the stationary portion 504 and the sealing ring 506 and the bushing 512 in the rotating portion 502. Moreover, the rotary seal arrangement 500 includes, in case of inner fluid leakage, the exhaust vent 514 which may include an exhaust valve. The rotary seal arrangement 500 allows a design of the rotating portion 502 to be separate from the remaining portions of the rotary seal arrangement 500.

In accordance with the provisions of the patent statutes, the present invention has been described in what is considered to represent its preferred embodiments, however, it should be noted that the invention can be practiced otherwise than as specifically illustrated and described without departing from its scope or spirit.

What is claimed is:

1. A rotary seal arrangement for use with a central tire inflation system, comprising:
   a stationary portion defining a first air passage therethrough;
   a rotating portion defining a second air passage therethrough;
   a first sealing ring disposed on one of the rotating portion and the stationary portion;
   a second sealing ring disposed on one of the rotating portion and the stationary portion; and
   a first bushing disposed on one of the rotating portion and the stationary portion, the first bushing in dynamic sealing engagement with the first sealing ring;
   a second bushing disposed on one of the rotating portion and the stationary portion, the second bushing in dynamic sealing engagement with the second sealing ring;
   wherein the first bushing and the second bushing are arranged radially from one another; and
   wherein the stationary portion, the rotating portion, the first sealing ring, and the second sealing ring form a sealed cavity that facilitates fluid communication between the first air passage and the second air passage.

2. The rotary seal arrangement according to claim 1, wherein the first bushing and the second bushing are arranged concentrically.

3. The rotary seal arrangement according to claim 1, further comprising an external ring disposed and coupled to the stationary portion.

4. The rotary seal arrangement according to claim 3, wherein the second sealing ring is mounted on the external ring.

5. The rotary seal arrangement according to claim 1, wherein the stationary portion defines a breather.

6. The rotary seal arrangement according to claim 5, further comprising an exhaust valve which facilitates fluid communication between an inner operating environment of the rotary seal arrangement and an ambient environment the rotary seal arrangement is operated in.

7. The rotary seal arrangement according to claim 1, wherein the stationary portion defines an exhaust vent which facilitates fluid communication between an inner operating environment of the rotary seal arrangement and an ambient environment the rotary seal arrangement is operated in.

8. The rotary seal arrangement according to claim 1, further comprising a dust lip disposed on one of the rotating portion and the stationary portion and in dynamic sealing engagement with a remaining one of the rotating portion and the stationary portion.

9. The rotary seal arrangement according to claim 1, wherein the sealed cavity is separate from bearings used adjacent the rotary seal arrangement.

10. The rotary seal arrangement according to claim 1, wherein the stationary portion is a stationary assembly comprising a main portion, a radially extending portion, and a seal engaging portion.

11. The rotary seal arrangement according to claim 10, wherein the seal engaging portion is coupled to the radially extending portion and the radially extending portion is coupled to the main portion.

12. The rotary seal arrangement according to claim 1, wherein the first bushing includes a fluid passage formed therethrough.

13. A rotary seal arrangement for use with a central tire inflation system, comprising:
   a stationary portion defining a first air passage therethrough, the stationary portion including an external ring disposed thereon and coupled thereto;
   a rotating portion defining a second air passage therethrough;
   a first sealing ring disposed on the rotating portion;
   a second sealing ring disposed on the external ring;
   a first bushing disposed on the stationary portion, the first bushing in dynamic sealing engagement with the first sealing ring; and
   a second bushing disposed on the rotating portion, the second bushing in dynamic sealing engagement with the second sealing ring, wherein the stationary portion, the rotating portion, the first sealing ring, and the second sealing ring form a, sealed cavity that facilitates fluid communication between the first air passage and the second air passage.

14. The rotary seal arrangement according to claim 13, wherein the stationary portion defines a breather.

15. The rotary seal arrangement according to claim 14, further comprising an exhaust valve which facilitates fluid communication between an inner operating environment of the rotary seal arrangement and an ambient environment the rotary seal arrangement is operated in.

16. The rotary seal arrangement according to claim 13, wherein the sealed cavity is separate from bearings used adjacent the rotary seal arrangement.

17. A rotary seal arrangement for use with a central tire inflation system, comprising:

a stationary assembly comprising a main portion, a radially extending portion, and a seal engaging portion, the stationary assembly defining a first air passage therethrough;

a rotating portion defining a second air passage therethrough;

a first sealing ring disposed on the seal engaging portion;

a second sealing ring disposed on the seal engaging portion;

a first bushing disposed on the rotating portion, the first bushing in dynamic sealing engagement with the first sealing ring; and a second bushing disposed on the rotating portion, the second bushing in dynamic sealing engagement with the second sealing ring, wherein the stationary portion, the rotating portion, the first sealing ring, and the second sealing ring form a sealed cavity that facilitates fluid communication between the first air passage and the second air passage.

18. The rotary seal arrangement according to claim 17, wherein the seal engaging portion is coupled to the radially extending portion and the radially extending portion is coupled to the main portion.

\* \* \* \* \*